(12) United States Patent
Nonomura

(10) Patent No.: US 7,230,655 B2
(45) Date of Patent: Jun. 12, 2007

(54) DIGITAL BROADCASTING RECEIVER

(75) Inventor: Takaya Nonomura, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 552 days.

(21) Appl. No.: 10/684,467

(22) Filed: Oct. 15, 2003

(65) Prior Publication Data

US 2004/0080674 A1 Apr. 29, 2004

(30) Foreign Application Priority Data

Oct. 15, 2002 (JP) ............................. 2002-300715
Oct. 15, 2002 (JP) ............................. 2002-300716

(51) Int. Cl.
- *H04N 5/44* (2006.01)
- *H04N 5/50* (2006.01)
- *H04N 5/445* (2006.01)

(52) U.S. Cl. ........................ 348/734; 348/569; 725/38

(58) Field of Classification Search ................ 348/734, 348/731, 569, 564, 732, 570; 725/38, 56; 341/176; 340/825.57, 825.69, 825.72, 825.73
See application file for complete search history.

(56) References Cited

U.S. PATENT DOCUMENTS

| | | | | |
|---|---|---|---|---|
| 5,161,023 A | * | 11/1992 | Keenan ...................... 348/732 |
| 5,414,426 A | * | 5/1995 | O'Donnell et al. ......... 341/176 |
| 5,532,748 A | * | 7/1996 | Naimpally ............. 375/240.25 |
| 5,673,089 A | * | 9/1997 | Yuen et al. ................... 725/38 |
| 5,886,746 A | * | 3/1999 | Yuen et al. ................. 348/564 |
| 6,072,535 A | * | 6/2000 | Kearns ....................... 348/563 |
| 6,137,539 A | * | 10/2000 | Lownes et al. ............. 348/569 |
| 6,198,513 B1 | * | 3/2001 | Cherrick ..................... 348/731 |
| 6,407,776 B1 | * | 6/2002 | Sekimoto et al. ........... 348/553 |
| 6,424,361 B1 | * | 7/2002 | Chapuis ...................... 715/854 |

* cited by examiner

*Primary Examiner*—Victor R. Kostak
(74) *Attorney, Agent, or Firm*—Westerman, Hattori, Daniels & Adrian, LLP.

(57) ABSTRACT

A demultiplexer separates channel list data and a remote control key ID from a digital broadcasting wave given off by a broadcasting station, and a CPU acquires the data. Frequency information and a channel list for receiving the broadcasting station are caused to correspond to a one-touch key having a number indicated by the remote control key ID. When a user presses the one-touch key, one channel is selected on the basis of a channel list in a memory. When the user continuously presses the one-touch key, for example, the channel list may be displayed on a screen so that the user can select a desired channel from the displayed list using a direction key and an enter key. Alternatively, when the user continuously presses the one-touch key, the subsequent channel in the channel list may be selected.

14 Claims, 5 Drawing Sheets

| ONE-TOUCH KEY SETTING MENU |||||||||||||
|---|---|---|---|---|---|---|---|---|---|---|---|---|
| KEY | 1 | 2 | 3 | 4 | 5 | 6 | 7 | 8 | 9 | 10 | 11 | 12 |
| No. | 000 | 001 | 003 | 008 | 005 | 002 | 007 | 006 | 009 | 010 | ... | ... |

ONE-TOUCH KEY SETTING PORTION

| No. | BROADCASTING STATION NAME | CHANNEL STRUCTURE |||||
|---|---|---|---|---|---|---|
| 001 | ○△× | 101 | 102 | 103 | 401 | 701 |
| 002 | △△ BROADCASTING DIGITAL | 151 | 152 | 451 | 452 | 751 |
| 003 | DIGITAL □□ | 171 | 771 | | | |
| 004 | DIGITAL ×× | 161 | 461 | 761 | | |
| 005 | ○○ DIGITAL BROADCASTING | 141 | 142 | 441 | 741 | 742 | 743 |

BROADCASTING STATION LIST PORTION (b)

| ONE-TOUCH KEY SETTING MENU |||||||||||||
|---|---|---|---|---|---|---|---|---|---|---|---|---|
| KEY | 1 | 2 | 3 | 4 | 5 | 6 | 7 | 8 | 9 | 10 | 11 | 12 |
| No. | 004 | 001 | 003 | 008 | 005 | 002 | 007 | 006 | 009 | 010 | ... | ... |

ONE-TOUCH KEY SETTING PORTION

| No. | BROADCASTING STATION NAME | CHANNEL STRUCTURE |||||
|---|---|---|---|---|---|---|
| 001 | ○△× | 101 | 102 | 103 | 401 | 701 |
| 002 | △△ BROADCASTING DIGITAL | 151 | 152 | 451 | 452 | 751 |
| 003 | DIGITAL □□ | 171 | 771 | | | |
| 004 | DIGITAL ×× | 161 | 461 | 761 | | |
| 005 | ○○ DIGITAL BROADCASTING | 141 | 142 | 441 | 741 | 742 | 743 |

BROADCASTING STATION LIST PORTION

DIGITAL BROADCASTING RECEIVER

BACKGROUND OF THE INVENTION

Field of the Invention

The present invention relates to a digital broadcasting receiver that receives digital broadcasting.

A digital broadcasting receiver that receives digital broadcasting using a satellite or a terrestrial wave selects any of a plurality of broadcasting waves received through a satellite antenna or a terrestrial wave antenna using a digital tuner, selects any of a plurality of channels included in the selected broadcasting wave using demultiplex processing, extracts a digital signal on the selected channel, and decodes the extracted digital signal, to output a video/audio signal.

In such digital broadcasting, it is considered that keys (a one-touch key, a preset key, etc.) are allocated for each broadcasting enterpriser, and a channel in a desired broadcasting enterpriser can be directly selected by operating the allocated keys. An example of the prior art related thereto is one for selecting one of a plurality of channels in one broadcasting enterpriser allocated in correspondence with a predetermined button (see JP-A-1998-149451).

In digital broadcasting, however, the same broadcasting enterpriser (the same broadcasting station), the same network, or the like can perform broadcasting on a plurality of channels in various formats as one group, for example, can perform broadcasting of standard image quality, high-definition television broadcasting, radio broadcasting, data broadcasting, etc. If a one-touch key is allocated to each of channels, therefore, the number of keys becomes enormous, thereby enlarging a remote control transmitter. Even if one of the plurality of channels in the broadcasting enterpriser can be selected by the preset key, as in the above-mentioned prior art disclosed in the gazette, it is difficult to find how many channels are there in addition to the selected channel. Further, when a user desires to see the other one of the plurality of channels, the channels are changed by operating a channel up/down key. In this case, the end of the user's finger must be moved from the preset key to the channel up/down key. Therefore, the operability of the channels is poor.

SUMMARY OF THE INVENTION

In view of the foregoing circumstances, an object of the present invention is to provide a digital broadcasting receiver which is superior in convenience and operability in channel selection.

In order to solve the above-mentioned problem, a digital broadcasting receiver according to the present invention is characterized by comprising means for causing grouped channel groups to respectively correspond to allocation keys; means for storing information related to channel selection of the channel group; means for performing, when the allocation key is operated, channel selection processing with respect to one of channels in the corresponding channel group; and means for displaying, when the allocation key is operated, the corresponding channel group as a list on a screen, to perform channel selection processing with respect to the channel selected by a user operation.

In the above-mentioned configuration, one of the channels can be selected from the channel group by the allocation key, and the user can select and tune in to, when he or she desires to see the other one of the plurality of channels, the desired channel in the channel group displayed as a list on the screen, thereby improving convenience in channel selection.

The digital broadcasting receiver may be so configured that both the display of a received video tuned in to and the display of the list can be performed by the initial operation of the allocation key. Alternatively, the digital broadcasting receiver may be so configured that only the display of a received video tuned in to is performed by the initial operation of the allocation key, and the display of the list can be performed on the received video by consecutively performing the second and subsequent operations of the allocation key.

The digital broadcasting receiver may be so configured that the position of a cursor on the displayed list is moved by the user operation, and the channel in which the cursor is positioned is selected by performing a determination operation. Alternatively, the digital broadcasting receiver may be so configured that a number indicating the channel is shown in the displayed list, and a user enters the number so that the channel is selected.

The digital broadcasting receiver may be so configured that the channel groups are grouped in correspondence with any one of the same broadcasting enterpriser, the same network, and the same transport stream. The digital broadcasting receiver may be so configured that processing for causing the grouped channel groups to respectively correspond to the allocation keys is performed on the basis of a remote control key ID included in a digital broadcasting wave with respect to the allocation key having a number indicated by the remote control key ID. Further, the digital broadcasting receiver may be so configured that processing for causing the grouped channel groups to respectively correspond to the allocation keys is performed with respect to the allocation key having a number designated by a user.

In order to solve the above-mentioned problem, a digital broadcasting receiver according to the present invention is characterized by comprising means for causing grouped channel groups to respectively correspond to allocation keys; means for storing information related to channel selection of the channel group; and means for performing, when the allocation key is operated, processing for selecting one of channels in the corresponding channel group, and in that the other channels are sequentially selected, every time the allocation key is operated, in the corresponding channel group.

In the above-mentioned configuration, one of the channels can be selected out of the plurality of channels in the group by the allocation key, and the user may repeatedly operate, when he or she desires to see the other one of the plurality of channels, the allocation key, thereby improving operability in channel selection.

The digital broadcasting receiver may be so configured that the channel groups are grouped in correspondence with any one of the same broadcasting enterpriser, the same network, and the same transport stream. Further, the digital broadcasting receiver may be so configured that processing for causing the grouped channel groups to respectively correspond to the allocation keys is performed on the basis of a remote control key ID included in a digital broadcasting wave with respect to the allocation key having a number indicated by the remote control key ID. Alternatively, the digital broadcasting receiver may be so configured that processing for causing the grouped channel groups to respectively correspond to the allocation keys is performed with respect to the allocation key having a number designated by a user.

The digital broadcasting receiver may be so configured that the channel finally selected in the grouped channel groups is stored, and the channel finally selected is first selected when the allocation key corresponding to the group including the selected channel is then operated. Further, the digital broadcasting receiver may be so configured that a list of the grouped channel groups is displayed on a screen, and there may be provided means for displaying the selected channel and the other channel such that a user can distinguish between the channels.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A digital broadcasting receiver 30 according to an embodiment of the present invention will be described on the basis of FIGS. 1 to 5.

Figure 1:
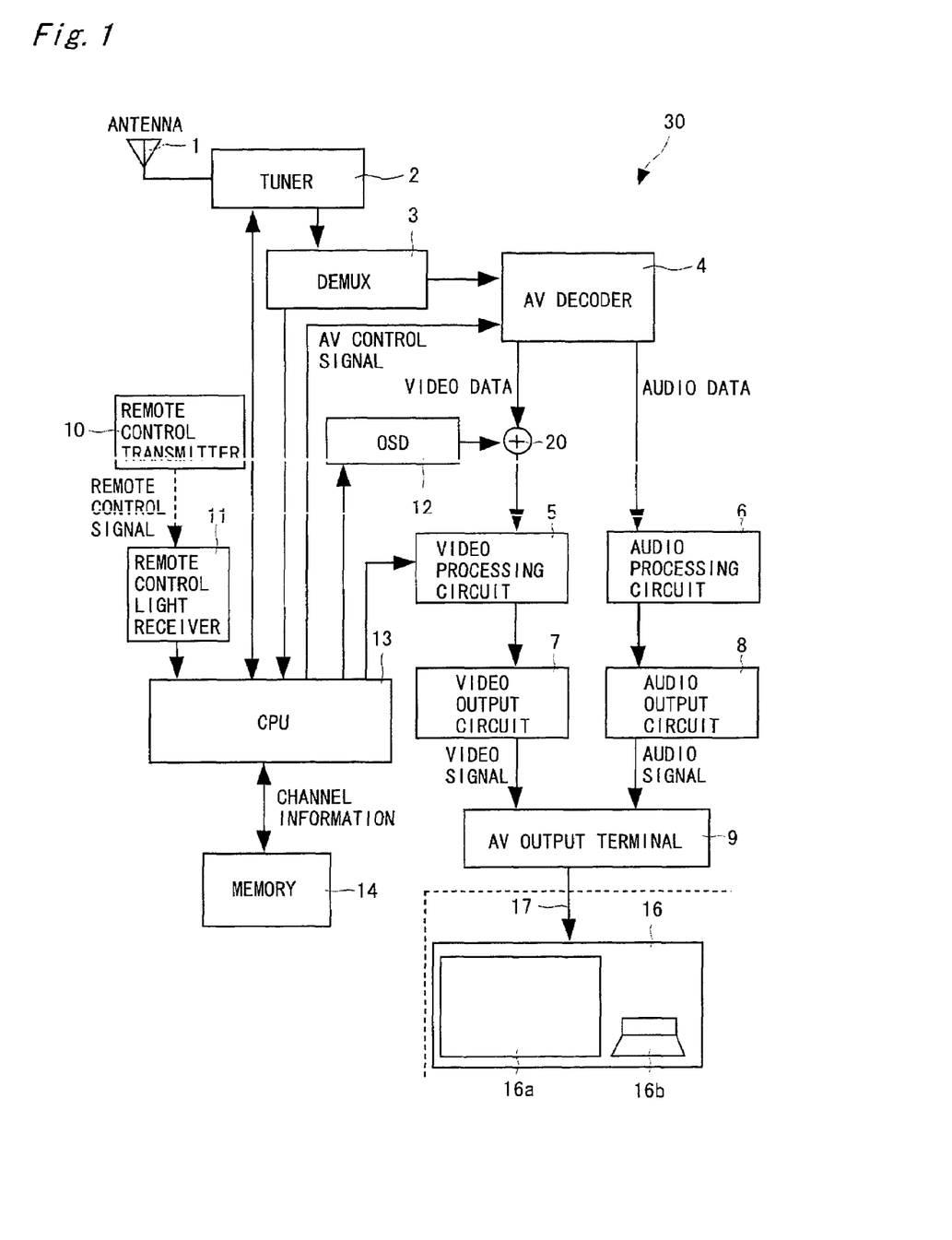
FIG. 1 is a block diagram showing a digital broadcasting receiver according to the present embodiment that receives terrestrial wave digital broadcasting.

In FIG. 1, a terrestrial wave antenna 1 is arranged in a predetermined direction outdoors, and receives a terrestrial wave digital broadcasting signal. The terrestrial wave antenna 1 feeds the received signal to a terrestrial wave digital tuner 2.

The terrestrial wave digital tuner 2 extracts, out of high-frequency digital modulation signals including video/audio data, the signal having a particular frequency. Further, the terrestrial wave digital tuner 2 comprises a demodulation circuit, an inverse interleave circuit, an error correcting circuit, and so on, thereby demodulating the selected digital modulation signal to output a transport stream.

A demultiplexer (DEMUX) 3 separates the above-mentioned transport stream into a video stream and an audio stream based on MPEG2 (Moving Picture Experts Group2) and PSI/SI (Program Specific Information/Service Information). The demultiplexer 3 feeds the video stream and the audio stream to an AV decoder 4, feeds to a CPU 13 program information, for example, included in the PSI/SI. A plurality of channels are multiplexed on the transport stream. Processing for selecting any of the channels can be performed by extracting data indicating which packet ID in the transport stream is used to multiplex the arbitrary channel from the above-mentioned PSI/SI. Further, the transport stream can be selected on the basis of the information in the PSI/SI.

The AV decoder 4 comprises a video decoder for decoding the video stream and an audio decoder for decoding the audio stream. The video decoder decodes a variable length code which has been inputted, to find a quantization factor and a motion vector, thereby carrying out inverse DCT (Discrete Cosine Transformation), motion compensation control based on the motion vector, and the like. The audio decoder decodes a coded signal which has been inputted, to produce audio data. The video data and the audio data which have been generated by the decoding are respectively outputted to a video processing circuit 5 and an audio processing circuit 6.

The video processing circuit 5 receives the video data from the AV decoder 4, and subjects the received video data to digital-to-analog (D/A) conversion, to convert the video data into a composite video signal, for example. The audio processing circuit 6 receives the audio data outputted from the AV decoder 4, and subjects the received audio data to digital-to-analog (D/A) conversion, to generate an analog signal of a right (R) sound and an analog signal of a left (L) sound, for example.

Each of a video output circuit 7 and an audio output circuit 8 comprises an output resistor, an amplifier, and so on. An AV output terminal 9 is provided with an output unit (a set of a right/left audio output terminal or the like and a video output terminal or the like). A monitor 16 comprising a CRT (Cathode-Ray Tube) 16a and a speaker 16b is connected to the output unit by a video/audio code 17.

An OSD (On-Screen Display) circuit 12 outputs to an adder 20 video data based on character information and color information which it is instructed to output from the CPU 13. The adder 20 performs processing for incorporating (superimposing) the above-mentioned video data into the received video data outputted from the AV decoder 4. By the OSD circuit 12, a menu screen, various types of setting screens, etc. can be displayed.

Figure 3:
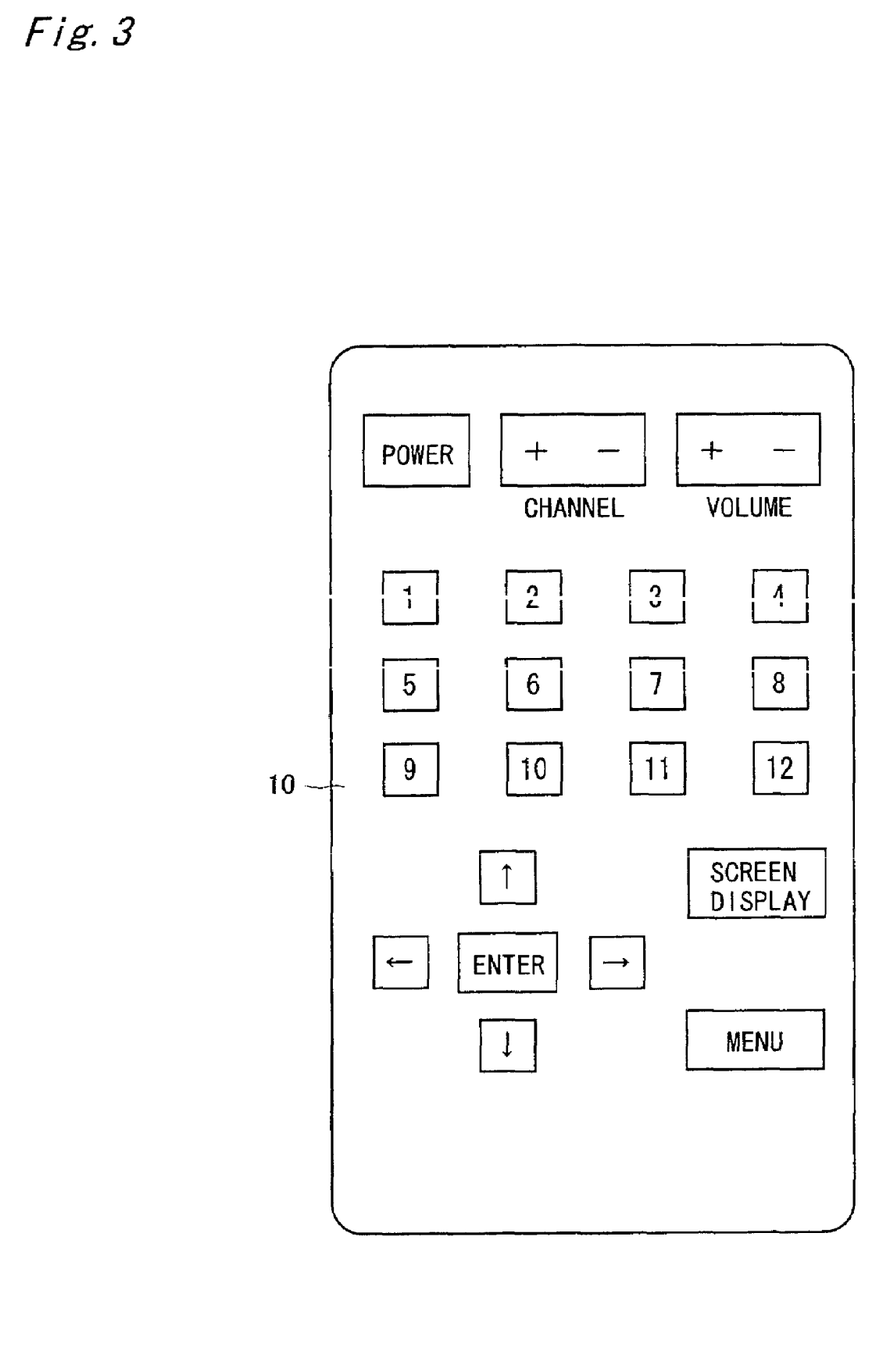
FIG. 3 is a plan view of a remote control transmitter.

A remote control transmitter 10 comprises various types of keys, as shown in FIG. 3, and sends out various types of commands to the broadcasting receiver 30. When the above-mentioned key is operated, signal light (a remote control signal) meaning a command corresponding to the operated key is sent out of a light emitting unit (not shown). A remote control light receiver 11 receives the signal light, converts the received signal light into an electric signal, and feeds the electric signal to the CPU 13. In the present embodiment, the keys numbered "1" through "12" which are provided in the remote control transmitter 10 are taken as allocation keys (hereinafter referred to as one-touch keys). Here, a case where one broadcasting enterpriser performs broadcasting using one transport stream is assumed, and one broadcasting enterpriser shall correspond to one one-touch key in this case.

A memory (e.g., a RAM, an EEPROM (Electrically Erasable and Programmable ROM), a flash memory, etc.) 14 stores channel information (frequency information, information such as a channel list and a broadcasting station name corresponding to a remote control key ID) in addition to information for displaying an EPG (Electronic Program Guide) screen.

Although the CPU 13 carries out overall control in the digital broadcasting receiver 30, it performs channel search processing, processing for acquiring a remote control key ID, processing for allocating a one-touch key, channel selection processing corresponding to a one-touch key operation, and so on.

(Channel Search Processing)

When the power is initially turned on, for example, the CPU 13 causes, when it receives an instruction to make a channel search from a menu screen by a user, the tuner 2 to tune in to the lowest frequency in a UHF (Ultrahigh Frequency) band in which terrestrial wave digital broadcasting is transmitted, to judge whether or not there exists a station.

When it is judged that there exists a station, information related to the frequency, information related to the station (the name of an affiliated broadcasting station, etc.), and data representing a channel list are extracted, and are stored in the memory 14. The processing is continued until the frequency is sequentially increased to the highest frequency (e.g., from Channel 12 to Channel 61).

(Processing for Acquiring Remote Control Key ID)

In the case of the above-mentioned channel search, PSI is separated from a transport stream in the existent frequency, and a remote control key ID (a TS number descriptor) in an NIT (Network Information Table) in the PSI is acquired, and is stored in the memory 14 in correspondence with the above-mentioned frequency information and the like.

(Processing for Allocating One-Touch Key)

Frequency information for receiving a broadcasting station corresponding to an acquired remote control key ID is caused to correspond to a one-touch key having a number indicated by the remote control key ID. That is, a ○○ broadcasting station adds "8" as a remote control key ID to a TS number descriptor and transmits the TS number descriptor having "8" added thereto, whereby information related to the transmitted TS number descriptor is received to acquire the remote control key ID on the side of the receiver, and the ○○ broadcasting station is set in the one-touch key "8" in the remote control transmitter 10. When the one-touch key "8" in the remote control transmitter 10 is thereafter pressed by the user, a channel in the ○○ broadcasting station is selected.

(Channel Selection Processing by Operating One-Touch Key)

When the one-touch key "8" in the remote control transmitter 10 is pressed by the user, processing for selecting the channel in the ○○ broadcasting station is performed, as described above. Since a plurality of channels can be prepared in each of broadcasting stations in digital broadcasting, however, processing for selecting one of the channels in the above-mentioned channel list is performed. It is herein considered that each of the broadcasting stations tends to make the number of the typical channel in the provided channel group small (low). Therefore, the channel to be first selected is set to the channel having the smallest number in the channel group.

Figure 2:
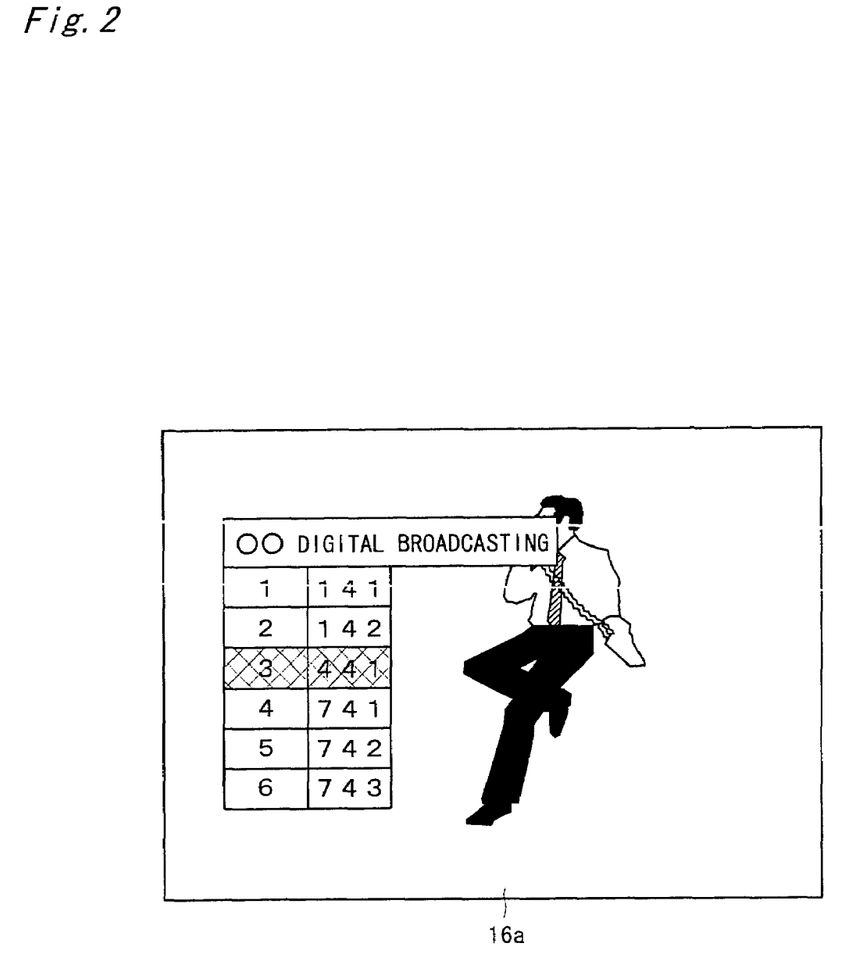
FIG. 2 is an explanatory view showing an example of a screen on which a list is displayed.

When the user continues to press the one-touch key "8", a list indicating the contents of the channel group is displayed on a screen, as shown in FIG. 2, by an OSD function. Although in FIG. 2, the list is displayed in a column, the list may be displayed in a matrix shape. Further, in order to prevent a received display video from being concealed as much as possible, such a format as to not display all the channels in the list but display the channels from Channel 1 to Channel 3, for example, and scroll-display the channels by operating a direction key in the remote control transmitter 10 may be employed. Although in the above-mentioned example, the list is displayed by consecutively performing the second and subsequent operations of the one-touch key, the list may be displayed by the initial operation of the one-touch key.

(Channel Selection Processing by Displayed List)

The receiver 30 detects the presence of the operations of the keys in the remote control transmitter 10, and moves the position of a cursor on the displayed list when it detects a signal from the direction key. The receiver 30 performs, when it detects the operation of an enter key in the remote control transmitter 10, processing for selecting the channel in which the cursor is positioned at that time. The channel selection is not limited to such selection using the cursor. For example, the desired channel on the displayed list may be made selectable by the user entering the number of the desired channel using the numeric keys (e.g., the keys numbered "0" through "9", etc. provided separately from the one-touch key), and then pressing the enter key.

As described in the foregoing, the one channel can be selected from the channel list by the one-touch key, and the user can know information related to the other channel in a group including the selected channel by the displayed list while seeing a receiving screen on the channel. When the user desires to see the other one of the plurality of channels, the desired channel in the channel group displayed as a list on the screen can be selected and tuned in to, thereby improving convenience in channel selection.

Figure 4:
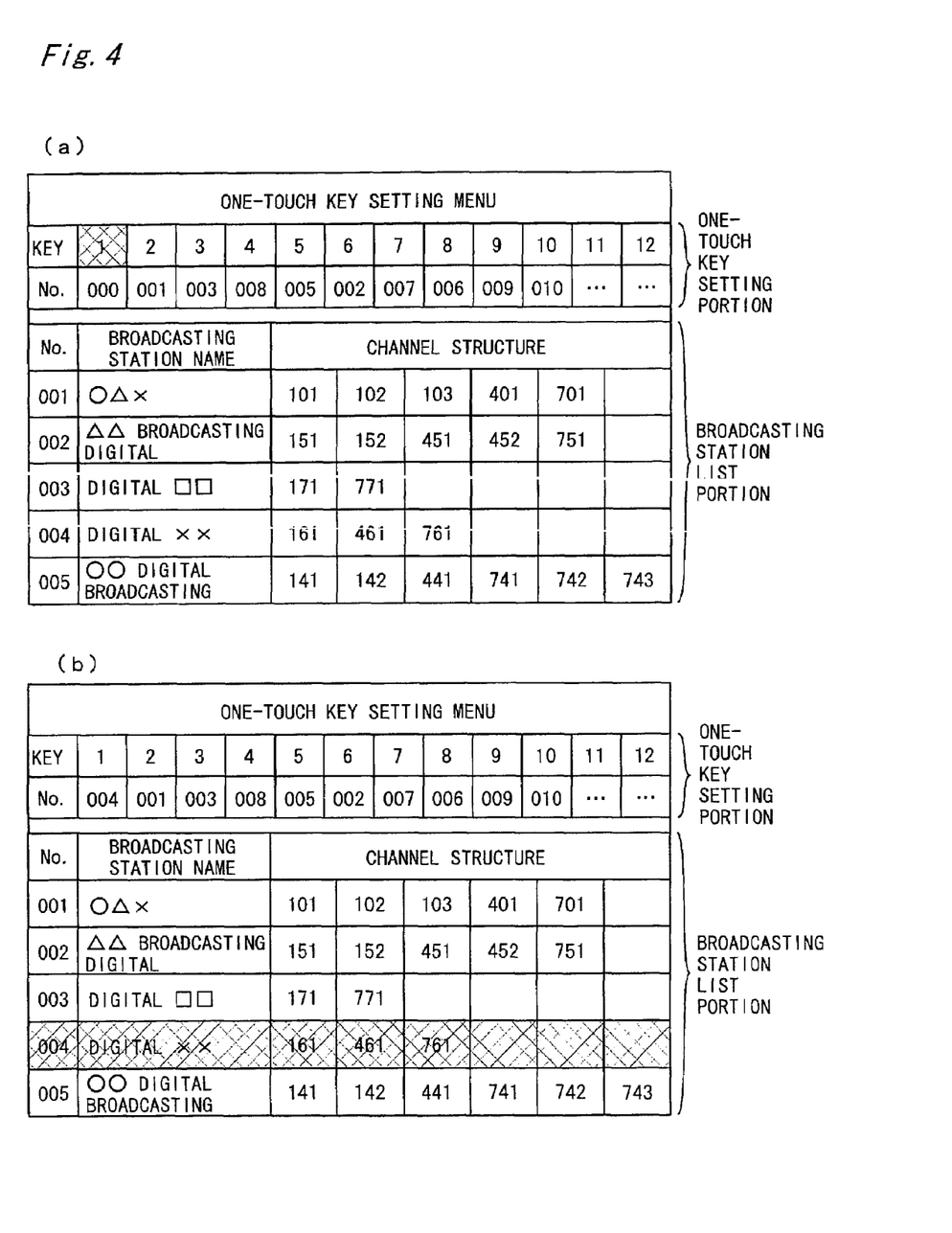
FIG. 4, consisting of FIGS. 4(a) and 4(b), is an explanatory view showing an example of a one-touch key setting menu screen.

Although in the above-mentioned example, the channel search is made with respect to all the channels from Channel 12 to Channel 61, information may be accepted by storing in the memory a correspondence table between an area code and a channel list made receivable in an area having the area code and the user entering the area code to receive only the channel in the list. Although the one-touch key is caused to correspond to the channel group on the basis of the acquired remote control key ID, a channel group in each broadcasting enterpriser may be caused to correspond to a one-touch key having a number to a user's taste without depending on the remote control key ID. When a one-touch key setting menu is called on a menu screen, for example, a setting screen is displayed, as shown in FIG. 4(*a*). On the setting screen, a broadcasting station having a broadcasting station list number "000" is caused to correspond to a one-touch key "1". If it is desired to change the broadcasting station corresponding to the one-touch key "1" to a broadcasting station having a broadcasting station list number "004", the direction key in the remote control transmitter 10 is first operated such that a cursor is moved to "1" in a one-touch key setting portion, and the enter key is pressed. When the enter key is pressed, the cursor is moved to a lower list portion. The direction key in the remote control transmitter 10 is operated such that the cursor is moved to a number "004" in a broadcasting station list portion, as shown in FIG. 4(*b*), and the enter key is pressed when the cursor is moved to the number "004". By such an operation, a broadcasting station having the broadcasting station list number "004" is caused to correspond to the one-touch key "1". The user may repeat the above-mentioned operation only by the number of one-touch keys to be set. Scroll-display may be made possible in consideration of a case where a list of broadcasting stations is difficult to display on one screen.

Although a case where the channel first selected in the operation of the one-touch key is set to the channel having the smallest number in the channel group including the channel is illustrated, the present invention is not limited to the same. For example, the channels selected in the above-mentioned channel change may be sequentially stored, and the channel finally selected last time (the last channel) maybe the channel to be first selected when the one-touch key "8" is operated next time.

Although the list of the channels belonging to the group is displayed on the screen by the OSD function, and the numbers indicating the order and the numbers of the channels are shown in this case, not only the numbers of the channels but also simple program information may be displayed.

Embodiment 2

In a case where the one-touch key "8" is pressed by the user in the above-mentioned item (Channel selection processing by operating one-touch key), and the one-touch key "8" is further continuously pressed, the channel having the next smallest number in the channel list is selected. Similarly, the channel having the next smallest number is selected every time the one-touch key is pressed, and the channel is returned to the first channel by pressing the one-touch key several times. Here, when intervals at which the one-touch key is pressed are within a predetermined time period, only processing for not actually selecting the channel but channel-hopping (changing the channels) on the channel list may be performed. Further, when a predetermined time period has elapsed since the one-touch key was pressed, processing for actually selecting the channel at that time point may be performed. Consequently, a time period during which a channel change operation is performed can be shortened, which is advantageous for a case where the number of channels is large.

As described in the foregoing, one of the plurality of channels in the channel list can be selected by the one-touch key, and the user may repeatedly operate, when he or she desires to see the other one of the plurality of channels, the one-touch key, thereby improving operability in channel selection.

Figure 5:
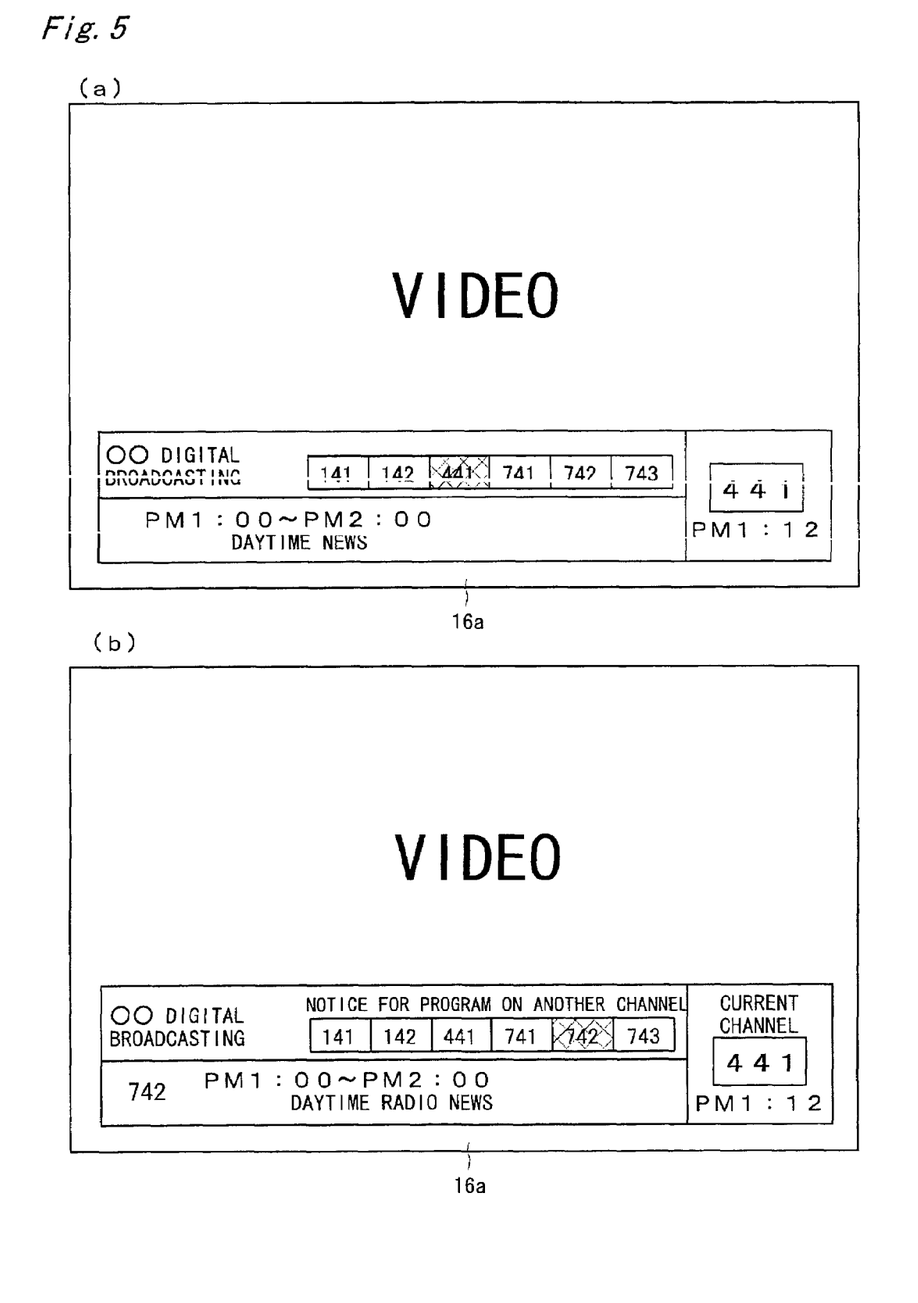
FIG. 5, consisting of FIGS. 5(a) and 5(b), is an explanatory view showing a screen on which a list of channels belonging to a group is displayed.

Furthermore, a list of channels belonging to a group may be displayed on a screen, as shown in FIG. 5, by an OSD function. For example, such a mode as to provide a "screen display" key in a remote control transmitter, perform display when the key is operated, and erase the display when the key is operated again, or such a mode as to provide a "channel list display mode" as a menu item and display a list of channels for a predetermined time period when a one-touch key is operated in a case where the mode is selected by a user may be employed. On a channel list screen shown in FIG. 5(a), the color of the selected channel is set to a color different from the color of display frames of the other channels, and the number of the selected channel is also displayed in another frame on the right side. Further, information obtained from information related to a program on the channel, the current time, etc. are shown. By thus providing a channel list display function, it is found at a glance which of the channels is selected by the consecutive operations of the one-touch key. As shown in FIG. 5(a), the channel list may be automatically displayed for several seconds not only at the time of pressing a screen display key and in a menu mode but also immediately after channel selection. On a channel list screen shown in FIG. 5(b), the number of the selected channel is displayed in the frame on the right side, and information related to a program on the other channel in a group including the selected channel can be displayed. In this displayed state, the user can select the channel on which information related to a program is to be displayed by operating rightward and leftward direction keys in the remote control transmitter 10. Such list display makes it possible to simply inform the user, while seeing a receiving screen on a certain channel, what program is being broadcast on the other channel in a group including the certain channel.

Although in these examples, a case where one broadcasting enterpriser performs broadcasting using one transport stream is assumed, and one broadcasting enterpriser shall correspond to one one-touch key in this case, the present invention is not necessarily limited to selection of a broadcasting enterpriser with a one-touch key if consideration is given to a case where one broadcasting enterpriser (broadcasting station) performs broadcasting using a plurality of transport streams or inversely given to a case where a plurality of broadcasting enterprisers (broadcasting stations) exist in one transport stream. For example, channel groups in one or two or more transport streams may be taken as one group. That is, it may be arbitrarily determined in what group unit the one-touch key is set in correspondence with judgment in what form broadcasting is being performed.

Furthermore, the channels may be selected in descending order of their numbers or may be selected in ascending order of their numbers in the group by the operation of a channel up/down key. In this case, when the channel up/down key is further operated after all channels are selected with respect to one group, the selection of channels in the subsequent group may be started.

As described in the foregoing, according to the present invention, one of a plurality of channels in a group can be selected by an allocation key, and a user may select, when he or she desires to see the other one of the plurality of channels, a desired channel in a channel group displayed as a list on a screen, and repeatedly operate the allocation key, thereby improving convenience and operability in channel selection.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital broadcasting receiver comprising:
   means for causing channel groups to respectively correspond to allocation keys;
   means for storing information related to channel selection of said channel groups;
   means for performing, when an allocation key is operated, channel selection processing with respect to one of the channels in the corresponding channel group; and
   means for displaying, when said allocation key is operated, the corresponding channel group as a list on a screen, to perform channel selection processing with respect to the channel selected by a user operation.

2. The digital broadcasting receiver according to claim 1, wherein
   both the display of a received video tuned in to and the display of said list can be performed by the initial operation of the allocation key.

3. The digital broadcasting receiver according to claim 1, wherein
   only the display of a received video tuned in to is performed by the initial operation of the allocation key, and
   the display of said list can be performed on the received video by consecutively performing the second and subsequent operations of the allocation key.

4. The digital broadcasting receiver according to claim 1, wherein
   the position of a cursor on the displayed list is moved by the user operation, and
   the channel in which the cursor is positioned is selected by performing a determination operation.

5. The digital broadcasting receiver according to claim 1, wherein
   a number indicating the channel is shown in the displayed list, and
   a user enters said number so that the channel is selected.

6. The digital broadcasting receiver according to claim 1, wherein
   the channel groups are grouped in correspondence with any one of the same broadcasting enterpriser, the same network, and the same transport stream.

7. The digital broadcasting receiver according to claim 1, wherein processing for causing the channel groups to respectively correspond to the allocation keys is performed on the basis of a remote control key ID included in a digital broadcasting wave with respect to the allocation key having a number indicated by the remote control key ID.

8. The digital broadcasting receiver according to claim 1, wherein processing for causing the channel groups to respectively correspond to the allocation keys is performed with respect to the allocation key having a number designated by a user.

9. A digital broadcasting receiver comprising:

means for causing channel groups to respectively correspond to allocation keys;

means for storing information related to channel selection of said channel groups; and means for performing, when an allocation key is operated, processing for selecting any one the of channels in the corresponding channel group;

wherein the other channels are sequentially selected, every time said allocation key is operated, in the corresponding channel group;

a list of the channel groups is displayed on a screen, and there is provided means for displaying the selected channel and another channel such that a user distinguish between the channels.

10. The digital broadcasting receiver according to claim 9, wherein the channel groups are grouped in correspondence with any one of the same broadcasting enterpriser, the same network, and the same transport stream.

11. The digital broadcasting receiver according to claim 9, wherein processing for causing the channel groups to respectively correspond to the allocation keys is performed on the basis of a remote control key ID included in a digital broadcasting wave with respect to the allocation key having a number indicated by the remote control key ID.

12. The digital broadcasting receiver according to claim 9, wherein processing for causing the channel groups to respectively correspond to the allocation keys is performed with respect to the allocation key having a number designated by a user.

13. The digital broadcasting receiver according to claim 9, wherein the channel finally selected in the channel groups is stored, and said channel finally selected is first selected when the allocation key corresponding to the group including the selected channel is then operated.

14. The digital broadcasting receiver according to claim 9, where a list of the channel groups is displayed on a screen, and there is provided means for displaying the selected channel and another channel such that a user can distinguish between the channels.

* * * * *